United States Patent [19]
Tanaka et al.

[11] Patent Number: 5,850,597
[45] Date of Patent: Dec. 15, 1998

[54] RADIOFREQUENCY MODULE FOR RADIO CONTROL TRANSMITTER

[75] Inventors: Masahiro Tanaka; Satoshi Inokoshi, both of Mobara, Japan

[73] Assignee: Futaba Denshi Kogyo K.K., Mobara, Japan

[21] Appl. No.: 671,720

[22] Filed: Jun. 28, 1996

[30] Foreign Application Priority Data

Jun. 30, 1995 [JP] Japan .................................... 7-186618

[51] Int. Cl.$^6$ .................................................. H04R 17/00

[52] U.S. Cl. .......................................... 455/115; 455/119

[58] Field of Search .................................. 455/115, 116, 455/117, 114, 119, 127, 128, 129, 349, 343; 375/239, 254

[56] References Cited

U.S. PATENT DOCUMENTS

5,287,553  2/1994  Korycan .................................... 455/343

Primary Examiner—Tranh Cong Le
Attorney, Agent, or Firm—Oblon, Spivak, McClelland, Maier & Neustadt, P.C.

[57] ABSTRACT

An RF module for a radio control transmitter capable of detecting detaching of the RF module from a transmitter body while keeping the transmitter body turned on. The RF module includes a monitor circuit, which judges whether or not a modulation signal is outputted from the transmitter body within 1 second after the RF module is turned on and further judges, when it is judged that the modulation signal has been fed within 1 second, whether the modulation signal is a PCM signal or a PPM signal. When it is a PCM signal, an RV output is rendered "on"; whereas when it is a PPM signal, the RF output is rendered "off".

2 Claims, 7 Drawing Sheets

RADIOFREQUENCY MODULE FOR RADIO CONTROL TRANSMITTER

BACKGROUND OF THE INVENTION

This invention relates to a radiofrequency module for a radio control transmitter, and more particularly to a radiofrequency module of the synthesizer type which is constructed in a detachable manner.

Figure 6:
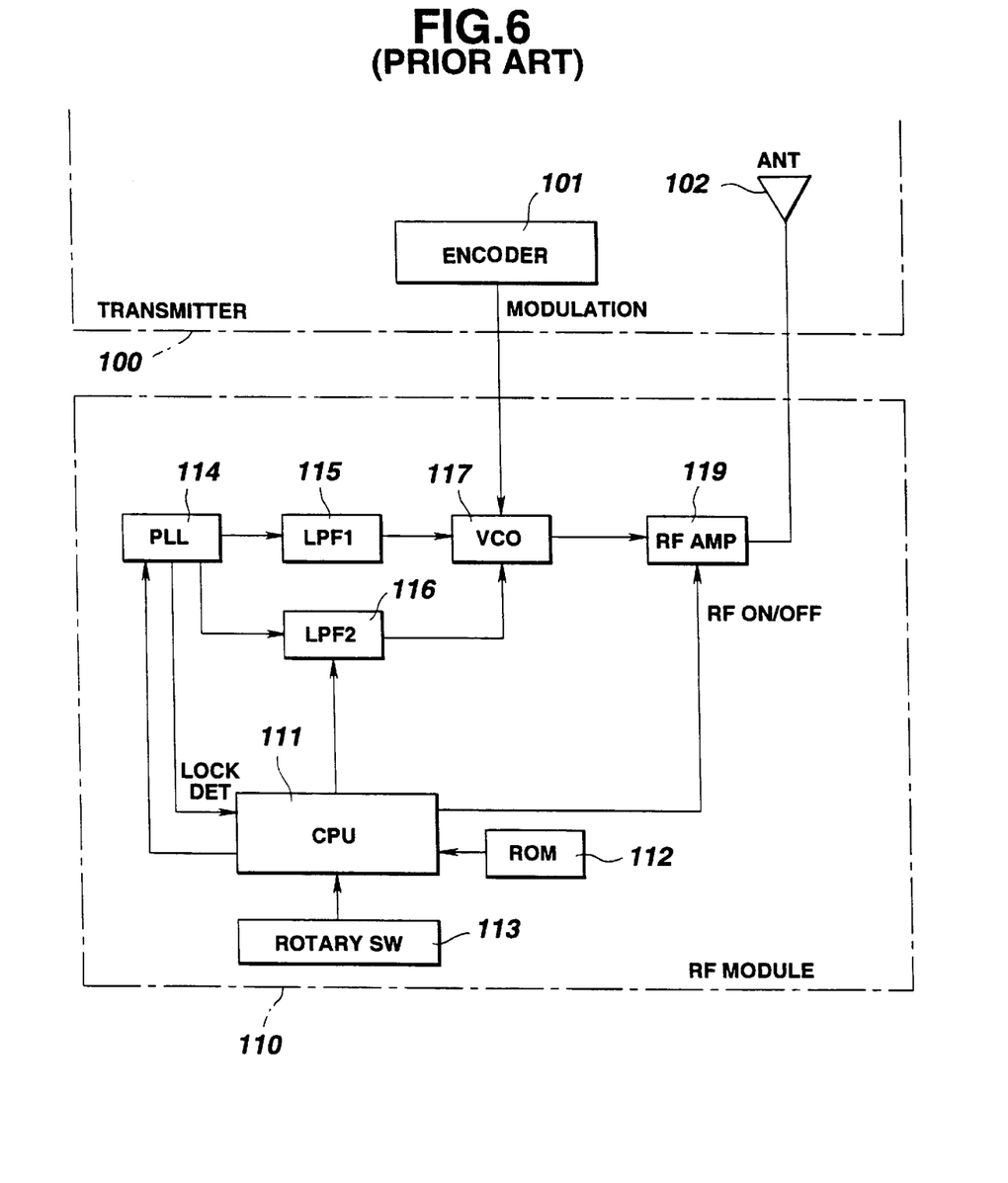
FIG. 6 is a block diagram showing a circuit of an RF module for a radio control transmitter which has been conventionally practiced in the art, wherein the RF module is kept mounted on a transmitter body.

A circuit for a radio control transmitter which has been conventionally practiced in the art is generally constructed in such a manner as shown in FIG. 6. More particularly, the radio control transmitter includes a transmitter body 100 and a radiofrequency (hereinafter also referred to as "RF") module 110. In FIG. 6, the RF module 100 is constructed into a synthesizer type. The transmitter body 100 and RF module 110 are received in a transmitter casing and a module casing independent from each other, respectively. The module casing is formed so as to be detachably mounted on the transmitter casing. Mounting of the module casing on the transmitter casing permits the transmitter body 100 and RF module 110 to be electrically connected to each other as shown in FIG. 6.

The RF module 110 has a carrier generating circuit, a modulation circuit and the like incorporated therein in the form of a module. A modulation signal is in the form of either a PCM (Pulse Code Modulation) signal or a PPM (Pulse Position Modulation) signal depending on the amount of operation of a stick or the like. The modulation signal is produced by an encoder 101 and fed to the RF module 110. The modulation signal functions to modulate a carrier of a designated frequency produced in the RF module 110.

The carrier modulated which is outputted from the RF module 110 is spatially transmitted from a rod-type antenna 102 arranged at the transmitter body 100. A frequency (frequency band) of a carrier which is permissibly used for such a radio control transmitter is differently or distinctively determined for every country or state.

In view of the fact, the radio control transmitter is constructed so as to replaceably arrange the RF module 110 or variably set a frequency of the RF module 110, to thereby permit a frequency band or frequency of a carrier which is to be transmitted from the transmitter to be varied, resulting in commonly used irrespective of a country or state.

The radio control transmitter wherein the RF module 110 is replaced for varying a frequency band of a carrier is classified into two types. One of the types is so constructed that a crystal oscillator is detachably arranged in the RF module 110. For this purpose, a plurality of crystals different in oscillation frequency are provided and selectively replaced with each other as desired, to thereby output a frequency desired.

The other type is called a synthesizer type wherein setting of a frequency of the RF module is varied to vary a frequency of a carrier. The RF module of the synthesizer type is constructed as shown in FIG. 6.

The RF module 110 includes a microprocessor (CPU) 111, which functions to recognize a frequency indicating a value set by a rotary switch 113 when the radio control transmitter including the transmitter body 100 and RF module 110 is turned on, to thereby read frequency information corresponding thereto from a frequency information table stored in a read only memory (ROM) 112. The frequency information thus read is fed to a PLL circuit 114 incorporated in the frequency module 110.

The frequency information thus fed is set in a frequency divider arranged in the PLL circuit 114, so that a frequency oscillated by a voltage control oscillator (VCO) 117 is subject to predetermined dividing and then subject to phase comparison with a reference oscillation frequency oscillated by a reference oscillator in a phase comparator. This results in the phase comparator generating a phase comparison signal, which is filtered through a low-pass filter (LPF1) 115 and a low-pass filter (LPF2) 116 and then applied in the form of an error voltage to the VCO 117. This permits an oscillation frequency of the VCO 117 to be controlled, so that the VCO 117 oscillates a carrier coinciding with a frequency indicated by the rotary switch 113.

The fact that a loop of a PLL oscillator consisting of the PLL circuit 114, low-pass filters 115 and 116, VCO 117 is locked with frequency information fed is detected by the CPU 111 to which a lock detection signal (LOCK DET) is fed from the PLL circuit 114, to thereby keep the VCO 117 from being fed with an error voltage which is outputted from the low-pass filter (LPF2) 116 when it is locked.

The low-pass filter (LPF1) 115 is kept decreased in cut-off frequency, to thereby decrease a steady-state deviation of the PLL loop. Unfortunately, this reduces a speed of response of the PLL loop. Thus, the low-pass filter (LPF2) 116 kept increased in cut-off frequency unless it is locked is incorporated in the PLL loop, to thereby increase a speed of response of the PLL loop. This permits the PLL oscillator to fall into a locked state rapidly.

The encoder 101 in the transmitter body 100 generates a modulation signal (MODULATION), which is then applied to the VCO 117, so that a carrier generated by the VCO 117 is subject to frequency shift keying (FSK) modulation. In this instance, the low-pass filter 116 is turned off, to thereby ensure satisfactory FSK modulation.

The CPU 111 includes an RF amplifier (RF AMP) 119, which is fed with an RF on-signal outputted in a predetermined period of time after it is turned on. The RF amplifier 119 is rendered active when the RF on-signal is at an active level, resulting in feeding an RF signal which has been subject to FSK modulation. The RF signal outputted from the RF amplifier 119 is transmitted from the rod-type antenna 102 arranged at the transmitter body 100.

Such cutting-off or interruption of operation of the RF amplifier 119 for a predetermined period of time is for the reason that a certain period of time is required to permit the PLL oscillation loop to be locked at a set frequency, thus, it is required to prevent a carrier of any undesired frequency outputted before it is locked from being transmitted from the antenna 102.

The CPU 111 continues to monitor the lock detection signal (LOCK DET) even after the RF on-signal is applied to the RF amplifier 119, resulting in reading frequency information from the ROM 112 to set it in the PLL circuit 114 again as soon as the PLL oscillation loop is released from the locking. This effectively prevents system down.

Figure 7:
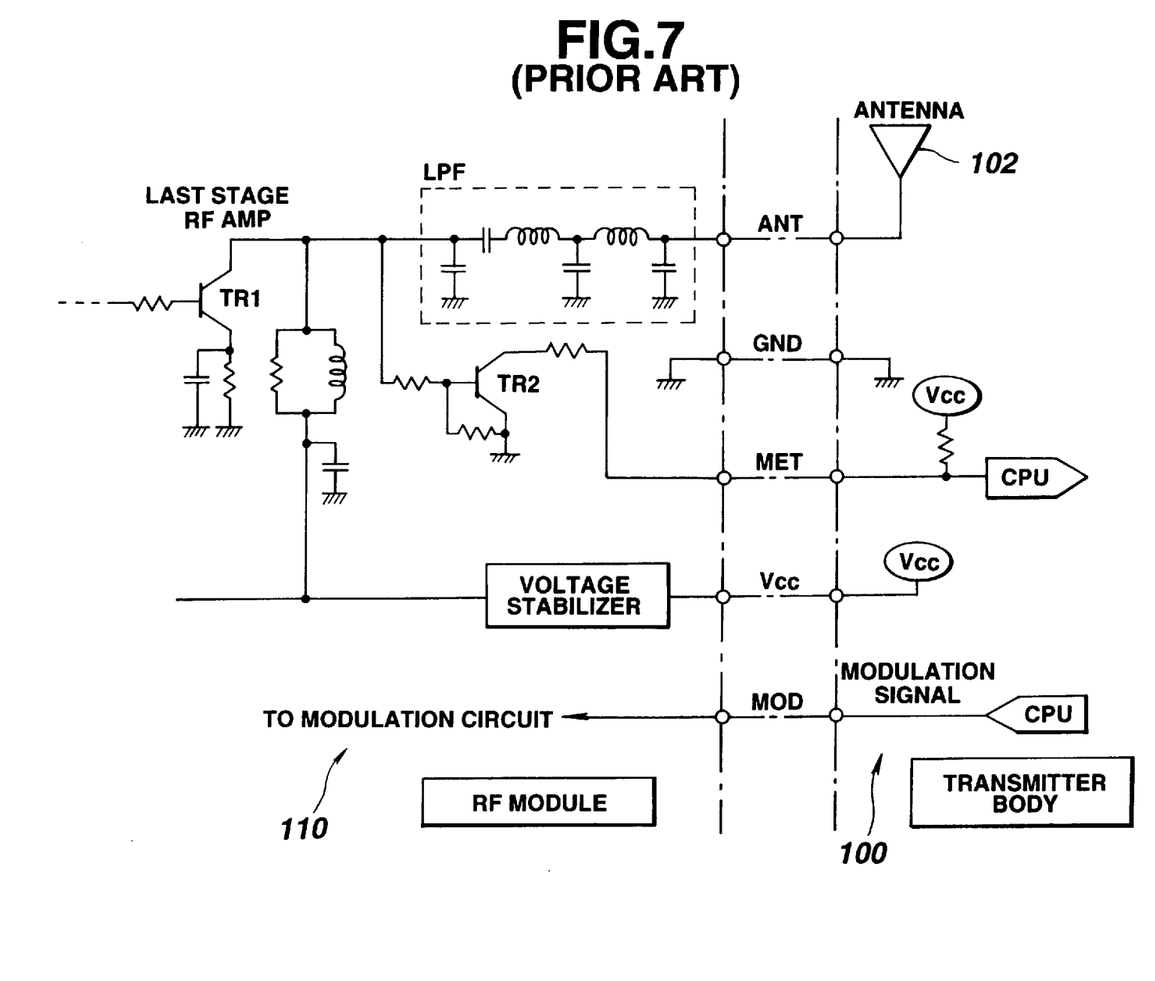
FIG. 7 is a circuit diagram showing a circuit showing connection between an RF module and a transmitter body by means of a pin and a jack when the former is mounted on the latter in the prior art.

A circuit of which connection is carried out by means of a pin and a jack when the RF module 110 is mounted on the transmitter body 100 is shown in FIG. 7.

In the circuit shown in FIG. 7, a ground (GND) on a side of the transmitter body 100 is connected to a ground of the RF module 110 and a power supply Vcc is connected therebetween. A voltage of the power supply Vcc is stabilized through a voltage stabilizer arranged in the RF module 110 and then fed to the circuit elements shown in FIG. 6. Also, a modulation signal (MOD) outputted from the CPU 111 constituting the encoder of the transmitter body 100 is fed to the VCO 117 which is a modulation circuit of the RF module 110. The modulation signals include two kinds of signals or a PPM signal and a PCM signal.

An RF signal outputted from an RF amplifier TR1 at a last stage of the RF amplifier 119 of the RF module 110 is red to a low-pass filter LPF, wherein an unnecessary frequency component of the RF signal is removed therefrom. Then, the RF signal is fed to the antenna 102 of the transmitter body 100.

The RF signal outputted from the RF amplifier TR1 is also fed to a detection amplifier TR2, to thereby be subject to detection and amplification, resulting in providing an RF detection signal (MET), which is then fed to the CPU of the transmitter body 100.

This results in the CPU 111 of the transmitter body 100 judging whether the RF module 110 generates an RF output. This is for the reason that the RF module of the synthesizer type causes a deviation in frequency of a carrier outputted from the PLL oscillator when the PLL oscillator is modulated with a PPM signal in the case that the modulation signal is a PPM signal, whereas the RF module of the crystal type does not causes such a deviation, so that it is required to prevent the deviation while judging a type of the RF module.

Such a deviation in frequency in the RF module of the synthesizer type may be prevented, for example, by setting a duty ratio of the PPM signal at 50%, as disclosed in Japanese Utility Model Application Laid-Open Publication No. 9698/1994.

For this purpose, a type of the RF module is discriminated by the CPU of the transmitter body 100 and a PPM signal having a duty ratio depending on the RF module discriminated is fed in the form of a modulation signal to the RF module, to thereby prevent a deviation in frequency irrespective of any type of the RF module.

Now, discrimination of a type of the RF module will be described. When the RF module 110 mounted on the transmitter body 100 has the crystal oscillator incorporated therein, an RF signal is outputted from the RF module 110 substantially concurrently with turning-on of a power supply of the transmitter; so that when the CPU judges that outputting of the RF signal has been carried out substantially concurrently with turning-on of the transmitter, it is judged that the RF module 110 mounted on the transmitter body 100 is the crystal type.

Whereas, when the RF module 110 mounted on the transmitter body 100 has the PLL oscillator incorporated therein, an RF signal is outputted in a predetermined period of time after the power supply is turned on because the PLL oscillator is locked at a carrier frequency of which an oscillation frequency is designated after a predetermined period of time elapses from turning-on of the power supply. Thus, when the CPU of the transmitter body 100 judges that an RF signal has been outputted in a predetermined period of time after turning-on of the power supply, it is judged that the RF module 110 mounted on the transmitter body 100 is the synthesizer type.

The reason why the RF module 110 of the synthesizer type does not output an RF signal before the PLL oscillator is locked at a carrier frequency is that the RF amplifier 119 is kept turned off for a fixed period of time to prevent a carrier of an undesired frequency outputted before the PLL oscillator is locked from being transmitted.

Figure 8A:
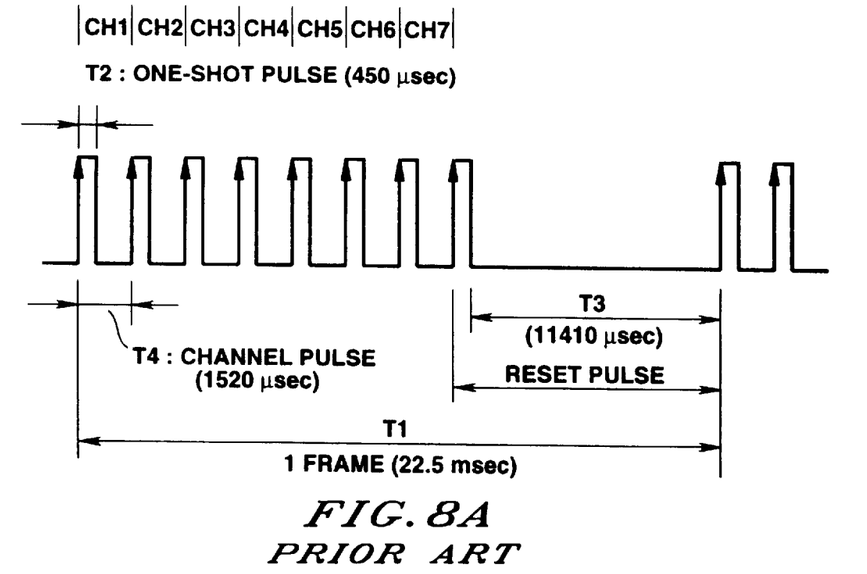
FIG. 8 is a group of waveform diagrams showing a format of a PPM signal, wherein (A) shows a format of a PPM signal which causes a deviation in frequency and (B) shows a format of a PPM signal which does not cause a deviation in frequency.
Figure 8B:
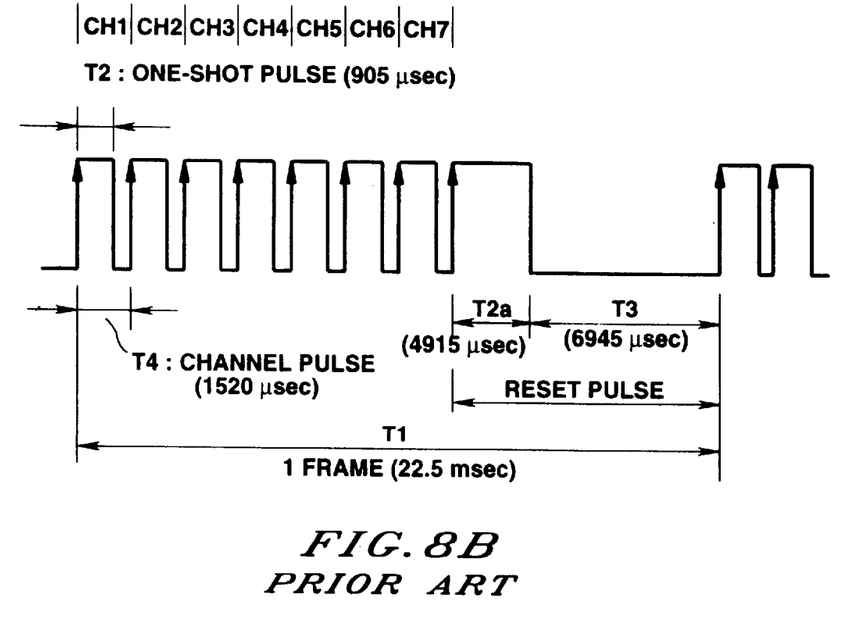

Now, a deviation in frequency in the RF module 110 of the synthesizer type will be described. FIG. 8 shows a format of a PPM signal obtained when the radio control transmitter has, for example, seven channels, wherein (A) indicates a PPM signal obtained when a control element such as a stick or the like provided on the radio control transmitter is at a neutral position.

In a system wherein the amount of operation of a control element is transmitted by means of a PPM signal, a variation in width of each of channels indicated at CH1 to CH7 in (A) of FIG. 8 permits the amount of operation of each of the channels to be transmitted. Such a seven-channel PPM signal is repeatedly transmitted, wherein a frame rate thereof is set to be 22.5 msec, a pulse width T2 of a leading edge of each channel pulse T4 is set to be 450 $\mu$sec and a width T3 of a reset pulse subsequent to a channel pulse of the channel CH7 is set to be 5 msec. Also, the channel pulse T4 is varied within a range of 1520±600 $\mu$sec.

A carrier is subject to FSK modulation by means of such a PPM signal of 16% in duty ratio; wherein the carrier is shifted to a frequency f1 when the PPM signal is at a high level and a frequency f2 when it is at a low level.

The amount of such shifting of the carrier is −1.5 kHz at the frequency f1 and +1.5 kHz at the frequency f2.

When the FSK modulation is carried out by applying the PPM signal to the VCO 117 constituting the PLL oscillator, the carrier outputted from the PLL oscillator is deviated in frequency because the PLL oscillator is so controlled that a frequency thereof is kept constant by the control loop.

Supposing that a central frequency Fo of the carrier is 72.79 MHz and a transition frequency of FSK modulation (a depth of the modulation) is +1.5 kHz when a pulse duty ratio of the PPM signal is 16% as shown in (a) of FIG. 8, the central frequency Fo is deviated in a direction in which it is increased by about 1 kHz.

A deviation in central frequency Fo of the carrier due to the FSK modulation causes either a decrease in sensitivity of receiving of a radio control receiver or radio interference, leading to a failure in normal remote control.

In view of the foregoing, the FSK modulation is carried out so as to convert the PPM signal having a pulse duty ratio of 16% shown in (A) of FIG. 8 into a PPM signal having a pulse duty ratio of 50% shown in (B) of FIG. 8, resulting in preventing a deviation in central frequency of the carrier.

The RF module is detachably mounted on the transmitter body, so that there is a fear that the RF module is detached from the transmitter body after turning-on of the transmitter body. Discrimination of a type of the RF module is executed only at the time of turning-on of the transmitter body, so that such detaching of the RF module from the transmitter body causes a failure in discrimination of a type of the RF module mounted on the transmitter body. For example, when the RF module of the synthesizer type is mounted on the transmitter body in place of that of the crystal type, this causes a failure in feeding of the PPM signal of 50% in duty ratio to the RF module, resulting in a deviation in frequency often occurring.

SUMMARY OF THE INVENTION

The present invention has been made in view of the foregoing disadvantage of the prior art.

Accordingly, it is an object of the present invention to provide an RF module for a radio control transmitter which is capable of detecting detaching of the RF module from a transmitter body after turning-on of the transmitter body.

In accordance with the present invention, an RF module for a radio control transmitter including a transmitter body, a control element for controlling a controlled unit and an encoder for feeding an encode signal to the RF module depending on the control element is provided which is detachably mounted on the transmitter body. The RF module has a monitor circuit arranged therein. The monitor circuit, when the RF module is constructed so that a carrier modulated by the encode signal is generated according to a PLL mode, monitors whether the encode signal is fed from the encoder within a predetermined period of time after turning-on of the RF module.

In a preferred embodiment of the present invention, when the encode signal is a PPM signal, the monitor circuit judges that the encode signal is a PPM signal, resulting in an RF signal outputted from the RF module being rendered "off".

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, an RF module for a radio control transmitter according to the present invention will be described hereinafter with reference to the accompanying drawings.

Figure 1:
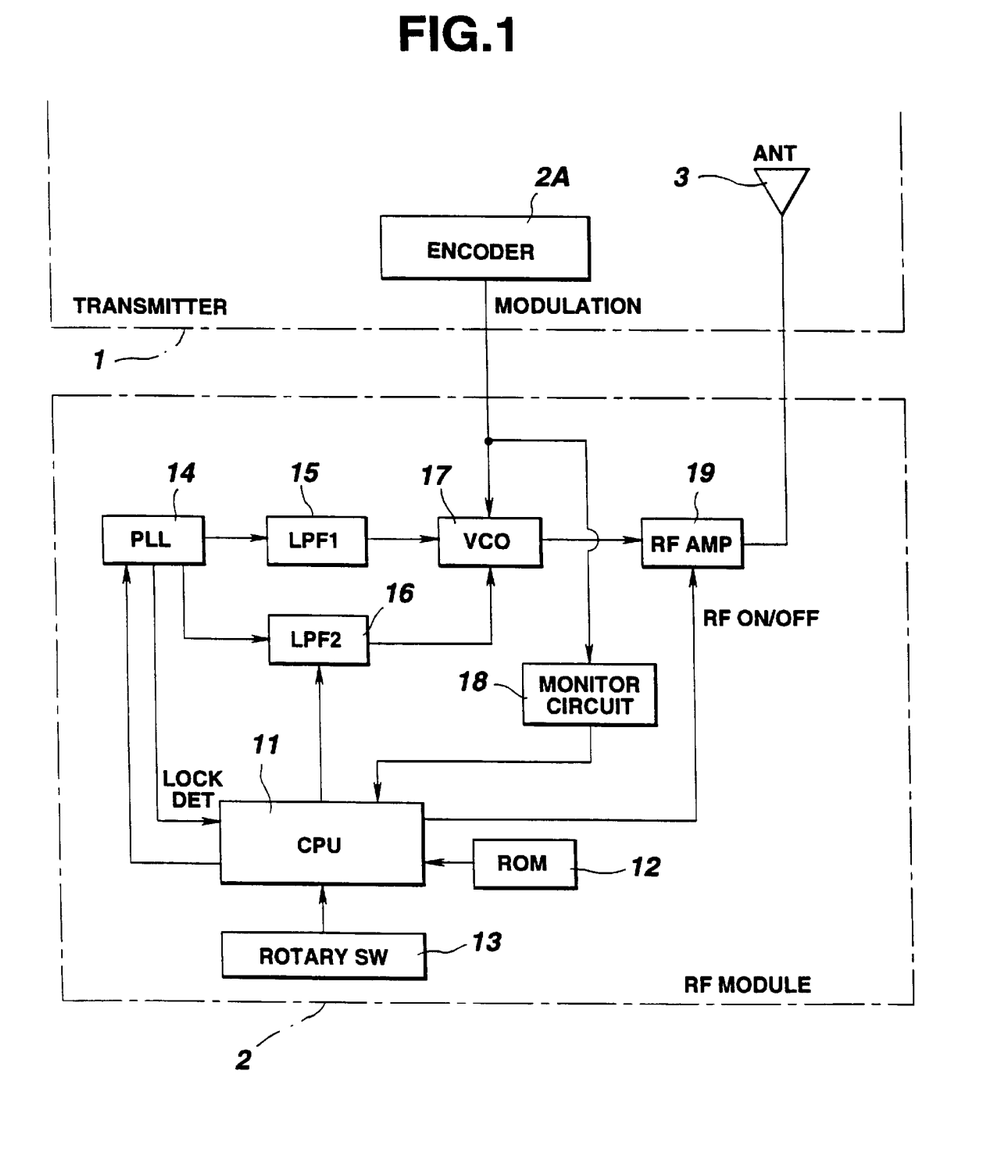
FIG. 1 is a block diagram showing an embodiment of an RF module for a radio control transmitter according to the present invention, wherein the RF module is kept mounted on a transmitter body of the radio control transmitter.

Referring now to FIG. 1, an embodiment of an RF module for a radio control transmitter according to the present invention is illustrated, wherein the RF module is kept mounted on a transmitter body. In FIG. 1, a transmitter body 1 on which an RF module of the illustrated embodiment designated at reference numeral 2 is to be mounted is provided with various control elements including a stick and the like, as well as a display means and the like. The RF module 2 of the illustrated embodiment is of the synthesizer type and is provided with. a monitor circuit 18.

The RF module 2 includes a microprocessor (CPU) 11, which functions to recognize a frequency indicating value set by a rotary switch 13 when the radio control transmitter including the transmitter body 1 and RF module 2 is turned on, to thereby read frequency information corresponding thereto from a frequency information table stored in a read only memory (ROM) 12. The frequency information thus read is fed to a PLL circuit 14 incorporated in the frequency module 2.

The frequency information thus fed is set in a frequency divider arranged in the PLL circuit 14, so that a frequency oscillated by a voltage control oscillator (VCO) 17 is subject to predetermined dividing and then subject to phase comparison with a reference oscillation frequency oscillated by a reference oscillator in a phase comparator. This results in the phase comparator generating a phase comparison signal, which is filtered through a low-pass filter (LPF1) 15 and a low-pass filter (LPF2) 16 and then applied in the form of an error voltage to the VCO 17. This permits an oscillation frequency of the VCO 17 to be controlled, so that the VCO 17 oscillates a carrier coinciding with a frequency indicated by the rotary switch 13.

The fact that a loop of a PLL oscillator constructed of the PLL circuit 14, low-pass filters 15 and 16, VCO 17 is locked with frequency information fed is detected by the CPU 11 to which a lock detection signal (LOCK DET) is fed from the PLL circuit 14, to thereby keep the VCO 17 from being fed with an error voltage which is outputted from the low-pass filter (LPF2) 16 when it is locked The low-pass filter (LPF1) 15 is kept decreased in cut-off frequency, to thereby decrease a steady-state deviation of the PLL loop. Unfortunately, this reduces a speed of response of the PLL loop. Thus, the low-pass filter (LPF2) 16 kept increased in cut-off frequency unless it is locked is incorporated in the PLL loop, to thereby increase a speed of response of the PLL loop. This permits the PLL oscillator to fall into a locked state rapidly and output a stable carrier after the locking.

The encoder 2A in the transmitter body 1 generates a modulation signal (MODULATION), which is then applied to the VCO 17, so that a carrier generated by the VCO 17 is subject to frequency shift keying (FSK) modulation. In this instance, the low-pass filter 16 is turned off, to thereby ensure satisfactory FSK modulation.

The CPU 11 includes an RF amplifier (RF AMP) 19, which is fed with an RF on-signal outputted in a predetermined period of time after a power supply of the RF module is turned on. The RF amplifier 19 is rendered active when the RF on-signal is at an active level, resulting in feeding an RF signal which has been subject to FSK modulation. The RF signal outputted from the RF amplifier 19 is transmitted from the rod-type antenna arranged at the transmitter body 1.

The monitor circuit 18 is adapted to detect, when the power supply of the RF module is turned on, whether or not a modulation signal is fed from the transmitter body 1 on which the RF module is mounted to the RF module within about 1 second after turning-on of the RF module. In this instance, when the modulation signal is detected in about 1 second or less after the turning-on, it is judged that a power supply of the transmitter body 1 has been turned on prior to the RF module. More particularly, it is judged that the RF module 2 is detached from the transmitter body 1 while keeping the transmitter body 1 turned on, so that the RF module 2 is turned on.

Also, when the monitor circuit 18 fails to detect feeding of the modulation signal in about 1 second or less after turning-on of the RF module 2, it is judged that the transmitter body 1 and RF module 2 have been concurrently turned on. More particularly, it is judged that the transmitter body 1 is turned on while keeping the RF module mounted on the transmitter body 1, so that the RF module 2 may be turned on.

When it is judged that the RF module 2 has been detached from the transmitter body 1 while keeping the transmitter body 1 turned on, the CPU 11 discriminates, by means of a detection signal outputted from the monitor circuit 18, whether the modulation signal fed from the the transmitter body 1 is a PPM signal or a PCM signal. As a result, when it is judged to be a PPM signal, an RF off-signal is applied to the RF amplifier, to thereby stop outputting of an RF signal from the RF amplifier 19.

Thereafter, the CPU 11 executes conversion of the PPM signal into a PCM signal for a synthesizer in the RF module 2 and then an RF on-signal is applied to the RF amplifier 19, so that an RF signal free of a deviation in frequency is transmitted from the antenna 3 of the transmitter body 1.

The transmitter body 1 and RF module 2 may be connected to each other by means of the circuit described above with reference to FIG. 7. The transmitter body 1 monitors an RF detection signal (MET) indicating an existence of the RF signal, to thereby feed the modulation signal to the RF module 2 when it detects the RF detection signal. This permits feeding of the modulation signal to be carried out after an oscillation frequency of the RF module 2 is stabilized. In this instance, the modulation signal is either a PCM signal or a PPM signal which is designated by a user.

Supposing that the modulation signal is a PPM signal; when the RF detection signal is detected in a predetermined period of time after the power supply of the transmitter body 1 is turned on, the RF module 2 is judged to be an RF module of the synthesizer type, so that a PPM signal having a duty ratio of 50% is fed to the RF module 2.

When the RF module 2 is detached from the transmitter body 1 while keeping the transmitter body 1 turned on, feeding of the RF signal is not carried out; so that when the transmitter body 1 detects that the RF module 2 fails to output the RF signal for a predetermined period of time, a user may be warned to that effect. This may cause the power supply to be turned on again, resulting in a modulation signal which has a duty ratio corresponding to an RF module 2 subsequently mounted being fed to the RF module 2, so that a radio control signal free of a deviation in frequency may be transmitted.

Figure 2:
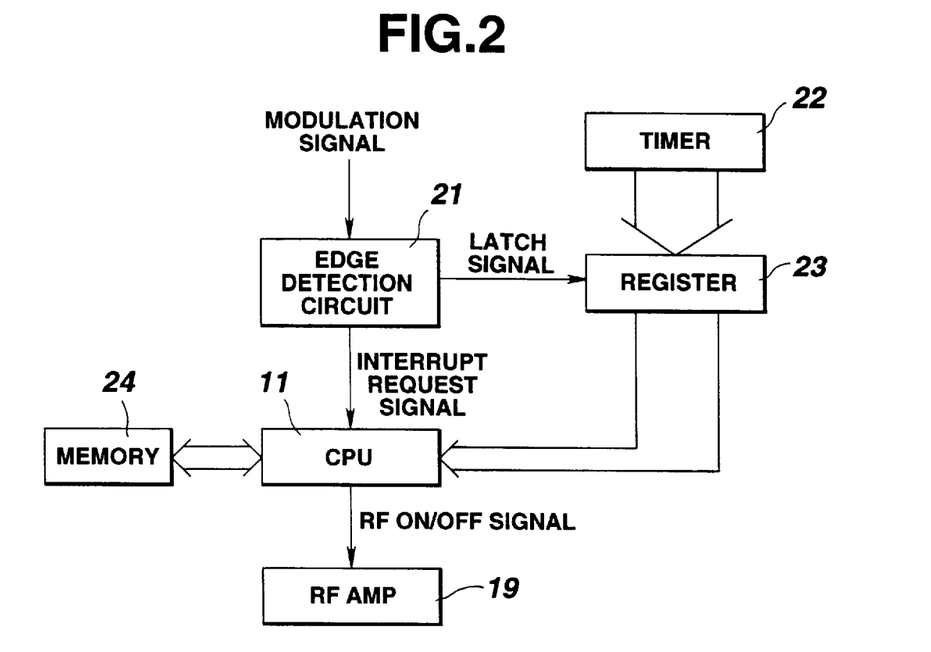
FIG. 2 is a block diagram showing elements associated with a monitor circuit in the RF module of FIG. 1.

Now, processing executed when the RF module 2 is turned on will be described with reference to FIG. 2 showing the monitor circuit 18 and peripheral elements associated with the CPU 11.

Figure 3:
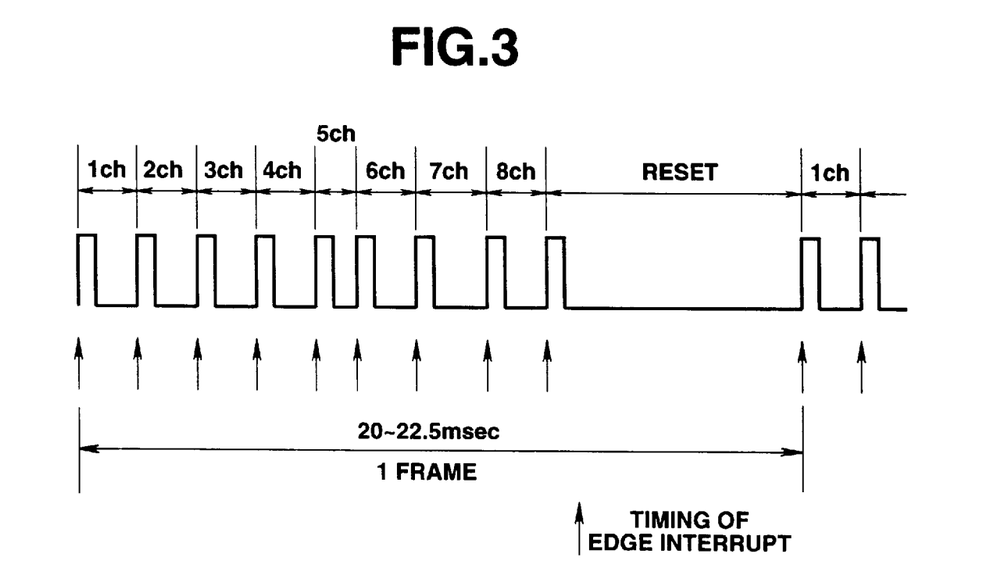
FIG. 3 is a diagrammatic view showing an example of a format of a PPM signal.

In FIG. 2, a modulation signal outputted from the transmitter body 1 is fed to an edge detection circuit 21, which detects a leading edge of a pulse of the modulation signal. In this instance, when the modulation signal fed is such a PPM signal as shown in FIG. 3, the edge detection circuit 21 detects the leading edge at leading timings of the PPM signal indicated at arrows in FIG. 3, to thereby feed an interrupt request signal to the CPU 11. Concurrently, a latch signal is applied to a register 23, so that a value counted by a timer 22 at that time is latched in the register 23. The counter 22 may be constituted by a free-run counter.

When the transmitter body 1 is turned on, the CPU 11 is adapted to accept edge interrupt in about 1 second or less after the turning-on. More particularly, it detects whether or not the RF module 2 is detached from the transmitter body 1 while keeping the transmitter body 1 turned on.

When the CPU 11 accepts interrupt request, it interrupts processing which has been executed heretofore and substitutionally executes interrupt processing stored in a program. The interrupt processing permits whether the modulation signal is a PPM signal or a PCM signal to be judged. When it is judged to be a PCM signal, the RF amplifier 19 is controlled so as to render an RF output "on"; whereas when it is judged to be a PPM signal, it is controlled so as to render the RF output "off". Then, processing of converting the PPM signal into a PPM signal having a duty ratio corresponding to the RF module mounted and the like is carried out.

Figure 4:
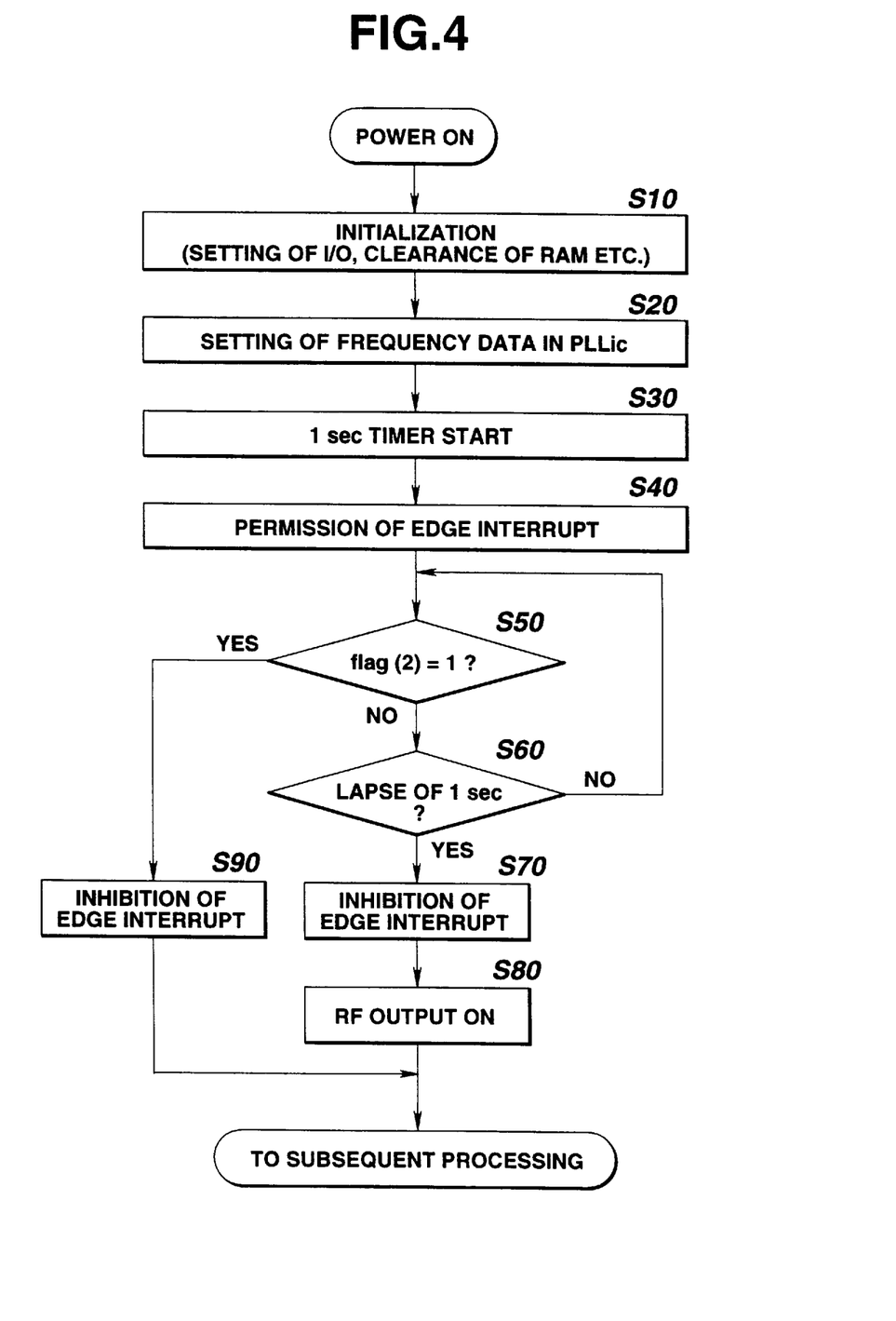
FIG. 4 is a flow chart showing a main routine in an RF module for a radio control transmitter according to the present invention.

FIG. 4 shows a flow chart of a main routine executed by the CPU 11 arranged in the RF module 2. When the RF module 2 is turned on, the main routine is started, so that initial processing such as setting of an I/O, clearance of a RAM and the like is started at a step S10. Then, at a step S20, when the RF module 2 is of the synthesizer type, frequency data determined by the rotary switch 13 are set an integrated PLLic constituting the PLL circuit. This permits preparation for feeding an RF signal of a designated frequency to the RF module 2 to be completed.

Then, at a step S30, a timer for counting 1 second is started and then edge interrupt is allowed at a step S40. This permits the CPU 11 to execute interrupt processing when the edge detection circuit 21 detects an edge of the modulation signal.

Subsequently, at a step S50, whether or not a flag (2) is "1" is judged. In this instance, the flag (2) is reset at "0" in the initial processing at the step S10, so that judgment "NO" is made, followed by execution of a step 60, wherein whether or not one second elapses in the timer is judged. In this instance, one second does not elapse yet, judgment "NO" is made, so that the procedure is returned to the step S50. This results in processing of the steps S50 and S60 being circularly executed.

At this time, when an edge of the modulation signal is detected, resulting in interrupt request being carried out, the CPU 11 executes interrupt processing.

Supposing that the interrupt processing is carried out plural times, to thereby cause the flag (2) to be "1", judgment "YES" is made at a step S50, followed by processing at a step S60, wherein edge interrupt is inhibited. In this instance, the RF output is still kept "off".

When one second elapses before the flag (2) is "1" even when the interrupt processing is executed, judgment "YES" is made at the step S60, resulting In the edge interrupt being inhibited, so that the RF output is rendered "ON" at a step S80 subsequent thereto. This permits the RF module 2 to generate an RF output.

Thus, the RF output is made "on" when the modulation signal is judged to be a PCM signal.

Figure 5:
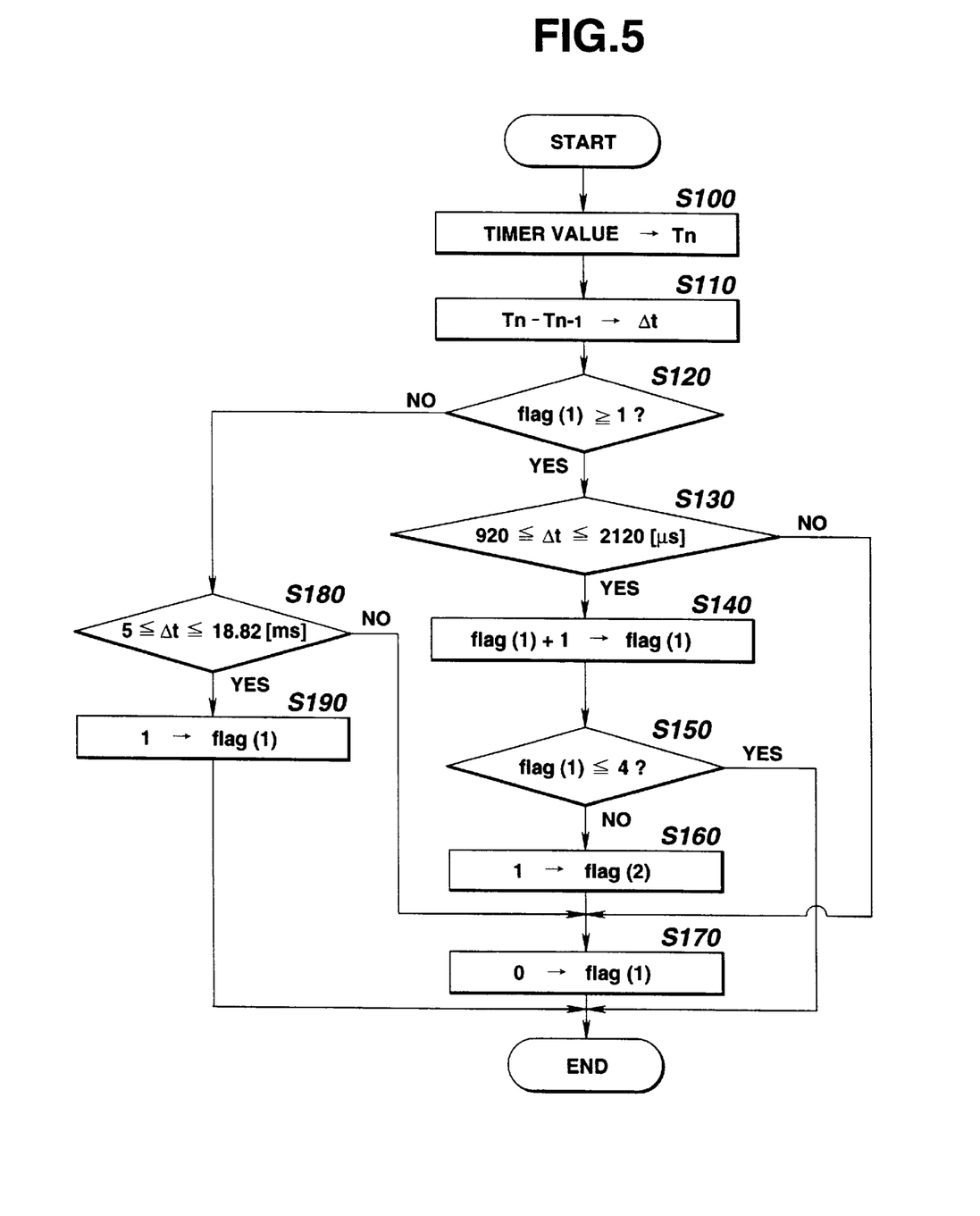
FIG. 5 is a flow chart showing interrupt processing in an RF module for a radio control transmitter according to the present invention.

Now, interrupt processing executed by the CPU 11 when the edge detection circuit 21 detects the edge will be described with reference to FIG. 5.

When the interrupt processing is started, a timer value latched in the register 23 is set in a register tn at a step S100. Then, a difference Δt between the timer value stored in the register tn and a value of the timer stored in a register tn−1 in which a previous value of the timer is stored is operated at a step S110. Subsequently, at a step S120, whether or not a flag (1) is "1" is made. In this instance, during initial processing, the flag (1) is kept reset at "0", judgment "NO" is made, followed by processing at a step S180, wherein whether or not the difference at is a time width between 5 msec and 18.82 msec.

The step S180 is to detect the reset pulse shown in FIG. 3 obtained when the modulation signal is judged to be a PPM signal. Before the reset pulse is detected, judgment "NO" is made at the step S180. Then, at a step S170 subsequent thereto, the flag (1) is reset at "0", resulting in the interrupt processing being completed.

The reset pulse is subsequent to the channel pulses of the channels 1ch to 8ch and indicates termination of the channel pulses and that of one frame. A width of the reset pulse is set to be at least 5 msec. A pulse width of each channel is varied depending on the control element; so that supposing that a length of one frame is 22.5 msec at four channels, a width of the reset pulse is at most 18.82 msec. At eight channels, the width is at most 15.14 msec.

When the reset pulse is detected at the step S180, the flag (1) is set at "1" at a step S190, resulting in the interrupt processing being completed.

When the edge detection circuit 21 detects the next edge, the next interrupt processing is executed. In this instance, the flag (1) is set at "1", so that judgment "YES" is made at a step S120, followed by transfer to a step S130. At the step S130, whether or not the difference Δt operated in the step S110 has a time width between 920 usec and 2120 usec is judged. The judgment is for detection of a channel pulse and, in interrupt processing subsequent to the interrupt processing in which the reset pulse is detected, whether or not the reset pulse is a channel pulse of the first channel Ch1 of the PPM signal is judged. When judgment "YES" is made, the procedure is transferred to a step S140, wherein "1" is added to the flag (1), so that the flag (1) has a value "2". Then, a step S150, whether or not the flag (1) is 4 or less is judged. In this instance, it is "2", so that judgment "YES" is made, resulting in the interrupt processing being completed.

Then, when the edge detection circuit 21 detects the next edge, interrupt processing is further activated. In this instance, the flag (1) is kept set at "2" by the previous processing, so that judgment "YES" is made at the step S120 and then judgment on a channel pulse is made at the subsequent step S130. When judgment "YES" is made, the procedure is advanced to the step S140. At the step S140, "1" is added to the flag (1), resulting in the flag (1) being "3". Thereafter, whether or not the flag (1) is "4" or below is judged at the subsequent step S150. However, at this time, it is judged to be "3", therefore, the interrupt processing is completed.

Further, when the edge detection circuit 21 detects an edge of the subsequent channel pulse, interrupt processing is repeatedly activated, so that substantially the same procedure as described above takes place. In the interrupt processing, the flag (1) has "1" added thereto, resulting in the flag (1) being "4". At the subsequent step S150, whether or not the flag (1) is "4" or less is judged. At this time, it is "4", resulting in judgment "YES" being made, so that the interrupt processing is completed.

In addition, when the edge detection circuit 21 detects the next edge, interrupt processing is activated again, so that substantially the same procedure is repeated. In the interrupt processing, the flag (1) has "1" added thereto at the step S140, resulting in the flag (1) being "5", so that the procedure is advanced to the step S150, wherein judgment "NO" is made because it is "5". Then, the flag (2) is set at "1" at a step S160 and then the flag (1) is reset at "0" at a step S170 subsequent thereto, so that the interrupt processing is completed.

When the flag (2) is thus "1", judgment "YES" is made at the step S50 in the main routine shown in FIG. 4 and edge interrupt is inhibited at the step S90, so that subsequent interrupt processing is inhibited.

Thus, when channel pulses of four channels subsequent to the reset pulse are detected, the modulation signal is judged to be a PPM signal, so that the RF output is rendered "off".

In this instance, the CPU 11 executes conversion of the PPM signal into a PPM signal for a synthesizer in the RF module 2, so that a RF signal free of a deviation in frequency may be transmitted. When the modulation signal is a PPM signal, a period of time for one frame may be 20 msec at four channels.

As can be seen from the foregoing, the present invention, when the RF module is detached from the transmitter body after turning-on of the transmitter body, permits mounting of the RF module after the turning-on to be detected. This results in a PPM signal having a duty ratio which corresponds to the RF module mounted being fed to the modulator in the RF module, to thereby effectively prevent a deviation in frequency of a signal transmitted from the radio control transmitter.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. An RF module for a radio control transmitter including a transmitter body, a control element for controlling a controlled unit and an encoder for feeding an encode signal to the RF module depending on said control element which is detachably mounted on said transmitter body, said RF module comprising:

a monitor circuit internally arranged;

said monitor circuit, when said RF module is constructed so that a carrier modulated by said encode signal is generated according to a PLL mode, monitoring whether said encode signal is fed from said encoder within a predetermined period of time after turning-on of said RF module.

2. An RF module as defined in claim 1, wherein when said encode signal is a PPM signal, said monitor circuit judges that said encode signal is a PPM signal, resulting in an RF signal outputted from said RF module being rendered "off".

* * * * *